United States Patent
Kang

(10) Patent No.: US 11,334,075 B2
(45) Date of Patent: May 17, 2022

(54) APPARATUS AND METHOD FOR CONTROLLING AUTONOMOUS VEHICLE

(71) Applicants: Hyundai Motor Company, Seoul (KR); Kia Motors Corporation, Seoul (KR)

(72) Inventor: Dong Hoon Kang, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 257 days.

(21) Appl. No.: 16/712,424

(22) Filed: Dec. 12, 2019

(65) Prior Publication Data

US 2020/0371518 A1 Nov. 26, 2020

(30) Foreign Application Priority Data

May 23, 2019 (KR) .................. 10-2019-0060651

(51) Int. Cl.
*G05D 1/00* (2006.01)
*G05D 1/02* (2020.01)

(52) U.S. Cl.
CPC .......... *G05D 1/0088* (2013.01); *G05D 1/0061* (2013.01); *G05D 1/0221* (2013.01); *G05D 2201/0213* (2013.01)

(58) Field of Classification Search
None
See application file for complete search history.

(56) References Cited

U.S. PATENT DOCUMENTS

| 10,161,754 | B2* | 12/2018 | Matsushita | G08G 1/166 |
| 2016/0009295 | A1* | 1/2016 | Chun | G07C 5/0808 |
| | | | | 701/32.9 |
| 2017/0329330 | A1* | 11/2017 | Hatano | G05D 1/021 |
| 2018/0259956 | A1* | 9/2018 | Kawamoto | B60W 40/09 |
| 2019/0025842 | A1* | 1/2019 | Kim | G05D 1/0061 |
| 2020/0031371 | A1* | 1/2020 | Soliman | B60W 30/18 |
| 2021/0181756 | A1* | 6/2021 | Zhu | G05D 1/0212 |

OTHER PUBLICATIONS

Sharma, Aditya, "All you need to know about Gradient Descent", 2018. (Year: 2018).*

* cited by examiner

*Primary Examiner* — Sze-Hon Kong
*Assistant Examiner* — Davin Seol
(74) *Attorney, Agent, or Firm* — Mintz Levin Cohn Ferris Glovsky and Popeo, P.C.; Peter F. Corless

(57) ABSTRACT

An apparatus and method for controlling an autonomous vehicle are provided. The apparatus includes a user input unit that receives identification information of a driver within the vehicle during autonomous driving and an information collection unit that acquires a global route of the vehicle and surrounding environment information. A controller determines a learning section on the global route based on the surrounding environment information and outputs a driving pattern of the driver by performing repetitive learning based on operation information of the driver in the learning section. Autonomous driving of the vehicle is then executed based on the output driving pattern of the driver.

15 Claims, 6 Drawing Sheets

APPARATUS AND METHOD FOR CONTROLLING AUTONOMOUS VEHICLE

CROSS-REFERENCE TO RELATED APPLICATION(S)

This application claims the benefit of Korean Patent Application No. 10-2019-0060651, filed on May 23, 2019, which is hereby incorporated by reference as if fully set forth herein.

BACKGROUND

Field of the Invention

The present invention relates to an apparatus and method for controlling an autonomous vehicle, and more particularly, to an apparatus and method for controlling an autonomous vehicle in which user-friendly autonomous driving control is performed by reflecting a driving pattern learned by a driver operation.

Discussion of the Related Art

Recently, interest in autonomous vehicles is rapidly increasing. In autonomous vehicles, advanced driver assistance systems (ADASs) are applied, and may thus liberate drivers from monotonous work, such as operation of a steering wheel and a pedal operation during driving of the vehicle, and reduce driver's erroneous operation thus preventing accidents.

The autonomous vehicles which are commercialized now prevent collision with an object by calculating a time to collision (TTC) based on information detected by sensors mounted in the vehicle, perform autonomous driving based on a monolithic driving strategy and adjust parameters and thus have limits in reflection of driving tendencies of various drivers, and further cause the driver to feel sense of difference between real driving and autonomous driving and thus lower ride comfort. Further, since it is difficult to consider all variables which may be generated in a real road environment which is unpredictable, the autonomous vehicles perform passive correspondence focused on safety rather than flexible correspondence.

SUMMARY

Accordingly, the present invention provides an apparatus and method for controlling an autonomous vehicle that substantially obviate one or more problems due to limitations and disadvantages of the related art. An object of the present invention is to provide an apparatus and method for controlling an autonomous vehicle in which user-friendly autonomous driving control may be performed by reflecting a driving pattern learned by driver operation.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an apparatus for controlling an autonomous vehicle may include a user input unit configured to receive identification information of a driver within the vehicle during autonomous driving, an information collection unit configured to acquire a global route of the vehicle and surrounding environment information, and a controller configured to determine a learning section on the route based on the surrounding environment information and output a driver driving pattern by performing repetitive learning based on driver operation information in the learning section. The controller may be configured to execute autonomous driving of the vehicle based on the output driver driving pattern.

The surrounding environment information may include at least one of road information, traffic information or obstacle information, collected by sensors mounted within the vehicle. The learning section may include at least one of a delayed/congested situation, an acceleration/deceleration situation, an unexpected situation, a straight section, a curved section, a downhill section or an electronic toll collection section.

The controller may be configured to switch from an autonomous driving mode to a manual driving mode and transfer a vehicle control right to the driver, when a current driving situation of the vehicle recognized based on the surrounding environment information corresponds to the learning section. The driver operation information may include operation information regarding at least one of a steering wheel, an accelerator pedal or a brake pedal, mounted within the vehicle.

The controller may be configured to learn the driver driving pattern by acquiring an error between an autonomous driving control value which is set in advance in the vehicle and at least one user control value which is calculated based on the driver operation information using comparison therebetween and updating the autonomous driving control value to cause a gradient of the error to a learning rate to converge within a minimum critical value. The controller may be configured to perform a validity test of the at least one user control value by applying a compensation weight to the error.

The compensation weight may be set to a different value based on at least one of a collision risk or a ride comfort index depending on the driver operation information. Each of the autonomous driving control value and the user control value may include at least one of a steering angle, an acceleration, a deceleration, a relative speed, a turning radius, a lateral acceleration or a longitudinal acceleration of the vehicle.

The apparatus may further include a storage unit configured to generate a learning table according to the identification information of the driver by constructing indexes for the learning section and the driver driving pattern. The controller may be configured to extract at least one boundary point on the route based on the driver driving pattern, generate a driving route by connecting a current position of the vehicle and the at least one boundary point through polynomial regression analysis, and execute the autonomous driving of the vehicle based on the generated driving route. The at least one boundary point may include a point at which a change rate of a steering angle exceeds a critical range.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate exemplary embodiment(s) of the invention and together with the description serve to explain the principle of the invention. In the drawings.

DETAILED DESCRIPTION

Figure 1:
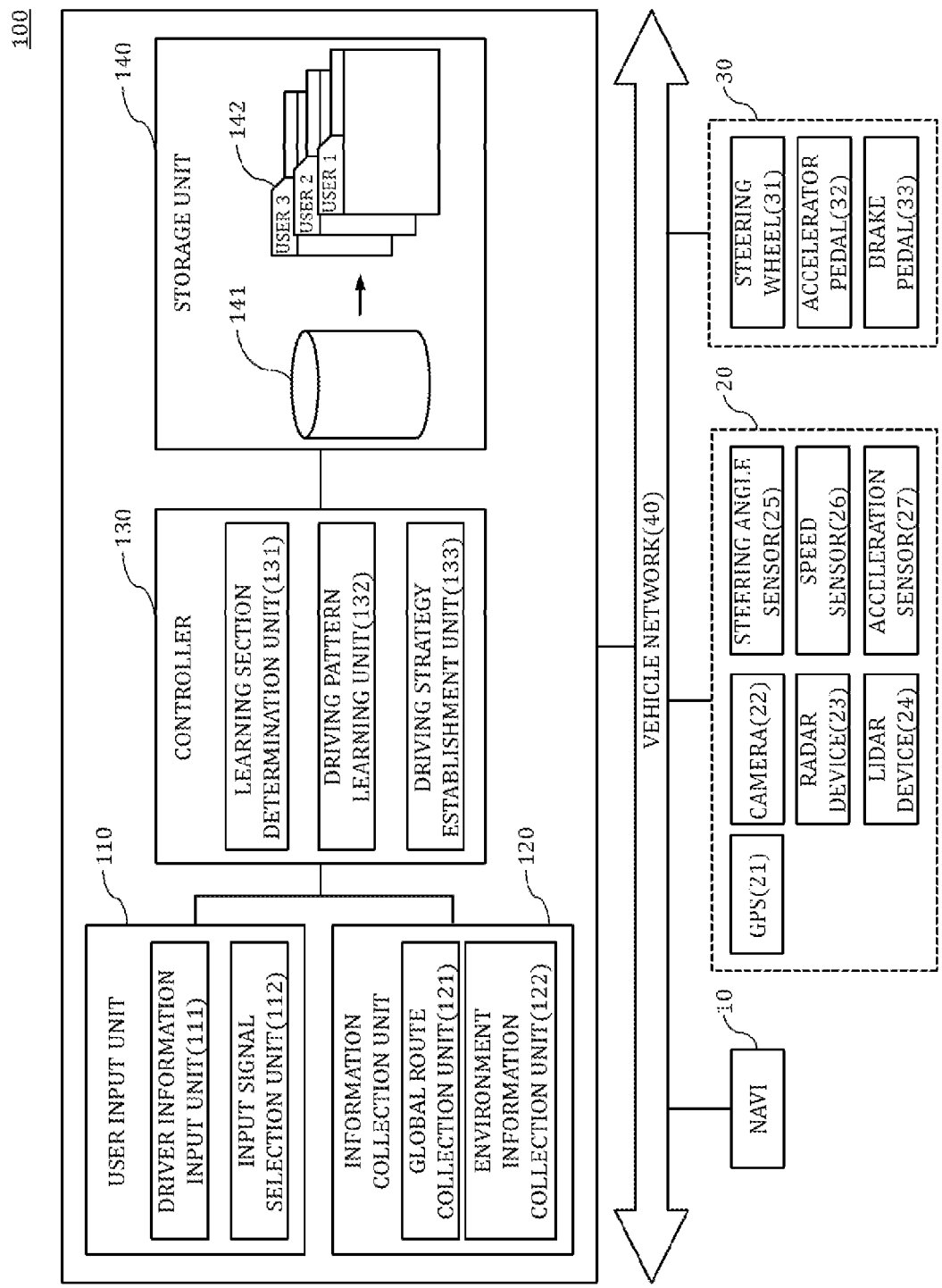
FIG. 1 is a schematic block diagram of an apparatus for controlling an autonomous vehicle in accordance with one exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Reference will now be made in detail to the exemplary embodiments of the present invention, examples of which are illustrated in the accompanying drawings. However, the disclosure of the invention is not limited to the embodiments set forth herein and may be variously modified. In the drawings, in order to clearly describe the present invention, description of elements which are not related to the present invention is omitted, and the same or similar elements are denoted by the same reference numerals even though they are depicted in different drawings.

In addition, in the following description of the exemplary embodiments, the terms "first", "second", etc. may be used to describe various elements, but do not limit these elements. It will be understood that these terms are used only to discriminate one element from other elements, and do not limit the nature, sequence or order of the corresponding element. It will be understood that terms which are specially defined in consideration of the configurations and functions of the exemplary embodiments are used only to describe the embodiments and do not limit the scope of the exemplary embodiments.

In the following description of the exemplary embodiments, all terms including technical or scientific terms have the same meanings as generally understood by those skilled in the art to which the present invention pertains, unless defined otherwise. Further, in the following description of the exemplary embodiments, generally used terms, such as terms defined in dictionaries, will be interpreted as having meanings coinciding with contextual meanings in the related art, and are not to be interpreted as having ideal or excessively formal meanings, unless defined clearly.

Hereinafter, an apparatus for controlling an autonomous vehicle in accordance with each exemplary embodiment of the present invention will be described with reference to the accompanying drawings.

FIG. 1 is a schematic block diagram of an apparatus for controlling an autonomous vehicle in accordance with one exemplary embodiment of the present invention. As exemplarily shown in FIG. 1, an apparatus 100 for controlling an autonomous vehicle may include a user input unit 110, an information collection unit 120, a controller 130, and a storage unit 140. The controller 130 may be configured to operate the other components of the apparatus 100.

The user input unit 110 may include a driver information input unit 111 configured to receive identification information of a driver in the vehicle during autonomous driving, and an input signal selection unit 112 configured to receive user input for an optimization request of autonomous driving control based on a driving pattern of the driver. The driver information input unit 111 may be configured to receive identification information including biometric information and/or registration information of at least one driver from an external apparatus via a vehicle network 40 and store the identification information in a database (DB; not shown) to generate driving patterns of various users. Particularly, the biometric information may include recognition information regarding irises, fingerprints, face or voice of the user, and the registration information may include a driver identification (ID) formed by a combination of Korean characters, English characters, numbers and special characters, or a contact information of the user, without being limited thereto.

The driver information input unit 111 may be configured to confirm whether the identification information of the driver received from the external apparatus corresponds to identification information of the driver stored in the database (not shown), and execute contact with the controller 130. The input signal selection unit 112 may be configured to convert a designated input signal applied by the driver, for example, at least one of an on signal, an off signal or a reset signal, into control instructions, and the driver may receive an optimization request of autonomous driving control based on a driving pattern of the driver and switch between driving modes of the vehicle by selecting at least one input part provided on the input signal selection unit 112.

Table 1 below exemplarily states control instructions processed according to the driver input signal applied to the input signal selection unit 112 and driving modes which are switched.

TABLE 1

| Input signal | Driving mode | Control instructions |
|---|---|---|
| 1. on | Manual driving mode | Initiation instructions to learn a driver's driving pattern (hereinafter, referred to as 'leaning initiation instructions') |
| 2. off | Autonomous driving mode | Instructions to set a recently learned driver's driving pattern as default (hereinafter, referred to as 'default setting instructions') |
| 3. reset | Autonomous driving mode | Instructions to initialize a driving pattern of the autonomous vehicle set in advance before coming onto the market (hereinafter, referred to as 'initialization instructions') |

Referring to Table 1, if an on signal is applied to the input signal selection unit 112 by the driver (e.g., an on signal is received as user input), the driving mode of the vehicle may be switched from an autonomous driving mode to a manual driving mode. Particularly, the autonomous driving mode refers to a state in which the vehicle is autonomously driven without driver intervention, and the manual driving mode refers to a state in which some of operations by the vehicle are restricted in a specific driving situation.

Then, the input signal selection unit 112 may be configured to convert the on signal into the learning initiation instructions and transmit the learning initiation instructions to the controller 130. In response, the controller 130 may be configured to transfer a vehicle control right to the driver in the specific driving situation, repeatedly learn driver's operation information applied to a driving device 30 and thus output a driving pattern of the driver. The input signal selection unit 112 may be configured to convert an off signal or a reset signal into the default setting instructions or the initialization instructions, and the controller 130 may be configured to perform autonomous driving of the autonomous vehicle by operating the driving device 30 using the recently learned driving pattern of the driver or the driving pattern of the autonomous vehicle set in advance before coming onto the market.

The user input unit 110 may be disposed within the vehicle, for example, in one region of an instrument panel, one region of a seat, one region of a pillar, one region of a door, one region of a center console, one region of a head lining, one region of a windshield or one region of a window. Further, a part of the user input unit 110 may be implemented as a button, which protrudes to the outside (or is dented), or a part or the entirety of the user input unit 110 may be implemented as a touch panel, and the user input unit 110 may be provided with at least one input part to detect various user inputs. For example, the input part may include a key pad, a touchpad (resistive type/capacitive type), a dome switch, a physical button or a jog shuttle.

The information collection unit 120 may include a global route collection unit 121 and an environment information collection unit 122. The information collection unit 120 may be configured to acquire a route (e.g., a global route) and surrounding environment information from various peripheral devices 10 and/or sensor devices 20 mounted within the vehicle. The information collection unit 120 may be configured to perform communication with the peripheral devices 10 and the sensor devices 20 via the vehicle network 40, and the vehicle network 40 may include various in-vehicle communication standards, such as a controller area network (CAN), a CAN with flexible data rate (CAN-FD), FlexRay, media oriented systems transport (MOST), time triggered Ethernet (TT Ethernet), etc.

The global route collection unit 121 may be configured to collect the route based on information of a departure point and a destination input to the peripheral device (hereinafter, referred to as a navigation system) 10. The navigation system 10 may be configured to store map information, in which roads and lanes are distinguishable, as a database (DB), and the map information may include nodes and links. Particularly, the node refers to a point at which properties of a road are changed, and the link refers to a route in a lane which interconnects one node and another node (e.g., a first node and a second node). Such map information may be updated automatically on a constant cycle via wireless communication, or updated manually by the user.

The environment information collection unit 122 may be configured to collect various surrounding environment information regarding driving situations of the vehicle from the sensor devices 20 mounted within the vehicle. In particular, the sensor devices 20 may include, for example, a global positioning system (GPS) 21 configured to acquire position information of the vehicle by receiving a navigation message from at least one GPS satellite located above the earth, a camera 22 configured to analyze surrounding image information of the vehicle using an optical system, a radar device 23 configured to analyze a distance from an object and relative speed to the object using electromagnetic waves, a lidar device 24 configured to observe blind areas which are not visible through radar, using light, and a steering angle sensor 25, a speed sensor 26 and an acceleration sensor 27 configured to measure steering angle, absolute speed and acceleration information of the vehicle.

The environment information collection unit 122 may be configured to collect the surrounding environment information including at least one of road information, traffic information or obstacle information, through a combination of at least one of the above-described sensor devices 20. For example, the environment information collection unit 122 may be configured to collect road information related to attributes of roads, such as curvatures, grades, intersections, junctions, crosswalks and tollgates of the road, based on map information stored in the navigation system 10 and surrounding image information analyzed using the camera 21.

Further, the environment information collection unit 122 may be configured to collect traffic information to recognize a delayed and congested traffic situation, such as a density of objects distributed around the vehicle, and/or obstacle information to recognize an unexpected situation, such as risk of obstacles installed on (or fallen onto) a road surface, based on at least one of the GPS 21, the radar device 23, the lidar device 24, the steering angle sensor 25, the speed sensor 26 or the acceleration sensor 27. Although not shown in the drawings, the environment information collection unit 122 may also be configured to collect surrounding environment information from other vehicles and objects in which infrastructure is constructed via vehicle to everything (V2X) communication.

The controller 130 may include a learning section determination unit 131, a driving pattern learning unit 132, and a driving strategy establishment unit 133. As the learning section determination unit 131 receives the learning initiation instructions applied from the user input unit 110, operation of the learning section determination unit 131 may be activated.

The learning section determination unit 131 may be configured to determine a learning section L on the route based on the various surrounding environment information collected by the information collection unit 120. For example, the learning section determination unit 131 may be configured to detect a current driving situation of the vehicle by combining at least one of the road information, the traffic information or the obstacle information collected by the environment information collection unit 120, and determine whether the recognized driving situation corresponds to the predetermined learning section L.

The learning section determination unit 131 may be configured to perform learning of only some driving situations that correspond to the learning section L out of the route to reduce a load caused by repetitive learning of the driving pattern learning unit 132, but the scope of the invention is not limited thereto. Table 2 below exemplarily represents the learning section L which is predetermined by the learning section determination unit 131.

repetitive learning based on driver's operation information reacting in the learning section L. The driver's operation information may refer to operation information which the driver gaining the vehicle control right applies to the driving device 30 mounted within the vehicle. Particularly, the driving device 30 may include a steering wheel 31 configured to adjust a direction of the vehicle, an accelerator pedal 32 configured to adjust a speed of the vehicle by adjusting an opening degree of a throttle of the vehicle, and a brake pedal 33 configured to decelerate the vehicle using frictional force.

The driving pattern learning unit 132 may be operated based on a reinforcement learning algorithm which is a type of machine learning, and perform learning based on a policy to recognize surrounding environment information using mutual information exchange with a driving situation and to maximize an action value function acquired through the driver's operation information (e.g., operation information of at least one of the steering wheel 31, the accelerator pedal 32 or the brake pedal 33) applied to the vehicle.

The driving pattern learning unit 132 may be configured to learn a driving pattern of the driver by acquiring an error $\delta$ between a first autonomous driving control value $\alpha$ which is set in advance in the vehicle based on set rules, and at least one user control value $\beta_i$ which is calculated based on the driver's operation information through comparison therebetween, and updating the first autonomous driving control value $\alpha$ so that a gradient $\Delta\delta$ of the error $\delta$ to a learning rate $\eta$ ($\Delta\delta=d\delta/d\eta$) converges on a minimum critical value, and output a second autonomous driving control value $\alpha'$ as a result of the above learning.

The first autonomous driving control value $\alpha$ refers a control value of at least one parameter which is learned or set in advance in the vehicle before the vehicle comes onto the market to perform autonomous driving. Additionally, the first autonomous driving control value $\alpha$ may be set in advance by a developer according to autonomous driving rules set based on traffic regulations and safe driving requirements, and the same first autonomous driving control value $\alpha$ may be applied to all drivers.

TABLE 2

| L1 | L2 | L3 | L4 | L5 | L6 | L7 |
|---|---|---|---|---|---|---|
| Delayed/ congested situation | Acceleration/ deceleration situation | Unexpected situation | Straight section | Curved section | Downhill section | Electronic toll collection section |

Referring to Table 2, the learning section L may be defined as a set of situations which occur during driving of the vehicle, and include, for example, a delayed/congested situation L1, an acceleration/deceleration situation L2, an unexpected situation L3, a straight section L4, a curved section L5, a downhill section L6, and an electronic toll collection section L7.

When the current driving situation of the vehicle corresponds to the learning section L, the learning section determination unit 131 may be configured to switch from the autonomous driving mode to the manual driving mode and transfer a vehicle control right to the driver (e.g., with no controller intervention). As the driving pattern learning unit 132 receives a vehicle control right transfer signal generated by the learning section determination unit 131, operation of the driving pattern learning unit 132 may be activated.

The driving pattern learning unit 132 may be configured to output a driving pattern of the driver by performing The user control value $\beta_i$ refers to a control value of at least one parameter which is sensed or calculated by the sensor device 20 in response dot various operation information which the driver gaining the vehicle control right applies to the driving device 30. The user control value $\beta_i$ may be varied according to the tendency, state, etc. of the driver operating the driving device 30.

The second autonomous driving control value $\alpha'$ refers to a control value of at least one parameter on which the at least one user control value $\beta_i$ converges (or into which the at least one user control value $\beta_i$ is smoothed) by repetitive learning. Additionally, the second autonomous driving control value $\alpha'$ may be set as a default value to perform autonomous driving of the vehicle after completion of learning. Particularly, the at least one parameter may include at least one of steering angle information, acceleration/deceleration information, heading/roll information calculated by various combinations thereof, relative speed information, lateral/longitudinal acceleration information or turning radius information.

Further, the error δ between the first autonomous driving control value α and the at least one user control value $\beta_i$ may be calculated using a mean squared error (MSE), as stated in Equation 1 below. However, it is only exemplary, and the scope of the invention is not limited thereto.

$$\delta = \frac{1}{n} \sum_{i=1}^{n} (\alpha - \beta_j)^2 \qquad \text{Equation 1}$$

wherein, n means a cumulative frequency of driver's operations applied to the driving device 30 in the corresponding learning section, a means a first autonomous driving control value, and $\beta_i$ means a user control value acquired by $i^{th}$ operation (1≤i≤n).

The learning rate η may be defined as a rate of the cumulative frequency of driver's operations to a critical learning frequency N, and expressed as $$\eta = \frac{n}{N} (0 < \eta \leq 1).$$

The critical learning frequency N may refer to a frequency of convergences of the error gradient Δδ within the minimum critical value, and the driving pattern learning unit 132 may be configured to output a driving pattern similar to an intention of the driver by performing repetitive learning until a frequency of learnings reaches the critical learning frequency N. In particular, the minimum critical value may be 0 or a value close to 0, and consequently, the above policy to maximize the action value function may be concluded as a policy to minimize the gradient Δδ of the error δ between the first autonomous driving control value α and the at least one user control value $\beta_i$.

Further, the driving pattern learning unit 132 may be configured to perform a validity test of the at least one user control value $\beta_i$ by applying a compensation weight w to the error δ. In particular, the compensation weight w may be set to a different value according to at least one of a collision risk w1 or a ride comfort index w2 based on the driver's operation information. For example, the driving pattern learning unit 132 may be configured to set the compensation weight w to 0 and thus treat the corresponding user control value as an ignorable value, if, as a result of driving according to the driver's operation information, the vehicle collides with a peripheral object or the ride comfort index w2 is reduced to a critical value or less. The compensation weight w may be set so that the collision risk w1 is inversely proportional to a time to collision (TTC) and the ride comfort index w2 is inversely proportional to the size of a jerk (a change rate of an acceleration).

Accordingly, the driving pattern learning unit 132 may be configured to perform the validity test of the at least one user control value $\beta_i$, and may thus promote vehicle safety and reduce sense of difference felt or experienced by the driver and passengers during operation of the vehicle. The driving strategy establishment unit 133 may be configured to transmit the driving pattern of the driver or the second autonomous driving control value α' output through the driving pattern learning unit 132 to the driving device 30, thus executing autonomous driving of the vehicle.

Figure 3:
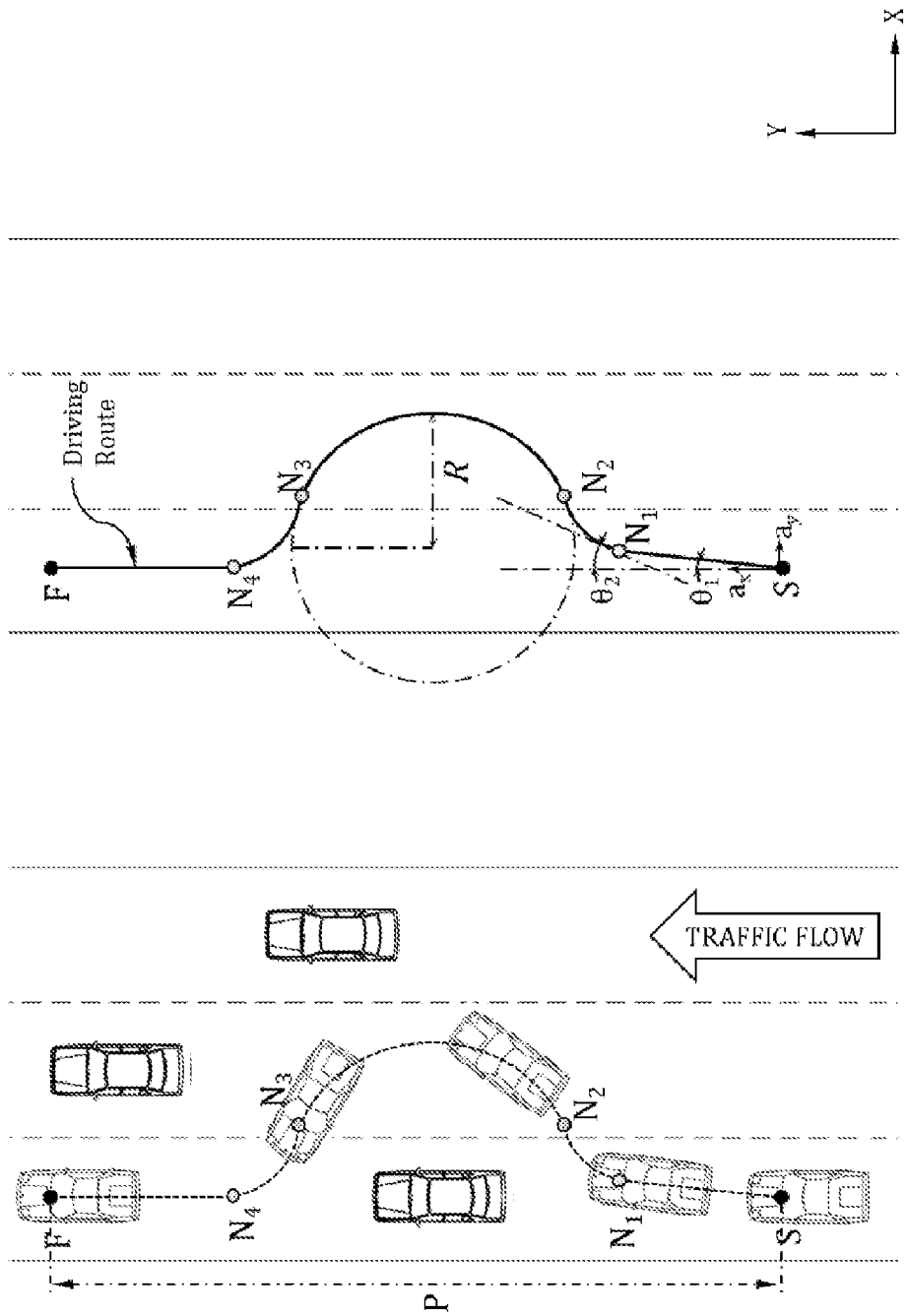
FIGS. 3A and 3B are views illustrating a method for generating a driving route through the control apparatus in accordance with one exemplary embodiment of the present invention.

Further, the driving strategy establishment unit 133 may be configured to extract at least one boundary point on the route based on the output driving pattern of the driver, generate a driving route by connecting the current position of the vehicle and the at least one boundary point through polynomial regression analysis, and execute autonomous driving of the vehicle based on the generated driving route. In particular, the at least one boundary point may include a point at which a change rate of the steering angle exceeds a critical range, and a detailed description thereof will be given later with reference to FIG. 3.

The storage unit 140 may be configured to generate and store a lookup table 141 and at least one learning table 142 that corresponds to driver identification information. The lookup table 141 may include the first autonomous driving control value α which is set in advance by the developer according to autonomous driving rules set based on traffic regulations and safe driving requirements, and be applied to all drivers.

Table 3 below exemplarily represents autonomous driving rules to generate the lookup table 141.

TABLE 3

| Control parameter | Autonomous driving rules |
|---|---|
| Steering angle information | prohibition of violation of a centerline set of a steering direction to recognized available space determination of a steering angle based on aTTC, a road curvature, and a critical value of a change rate of the steering angle per unit time |
| Acceleration/ deceleration information | maintenance of a safe distance from a front vehicle emergency braking when an obstacle is suddenly recognized determination of acceleration/deceleration based on the TTC, a road speed limit, a road gradient, and a critical value of a change rate of acceleration/deceleration per unit time |

The at least one learning table 142 may be generated by generating indexes for the learning section L and the driving pattern of the driver or the second autonomous driving control value α'. In particular, each of the at least one the learning table 142 may be generated to correspond to each of at least one driver identification information (e.g., user1, user2, user3, etc.), and thereby, customized autonomous driving control according to driving tendencies of various users may be possible and user's individual ride comfort requirements may be satisfied. The storage unit 140 may be implemented as at least one storage medium of a flash memory, a hard disk, a secure digital (SD) card, a random access memory (RAM), a read only memory (ROM), and a web storage.

Figure 2:
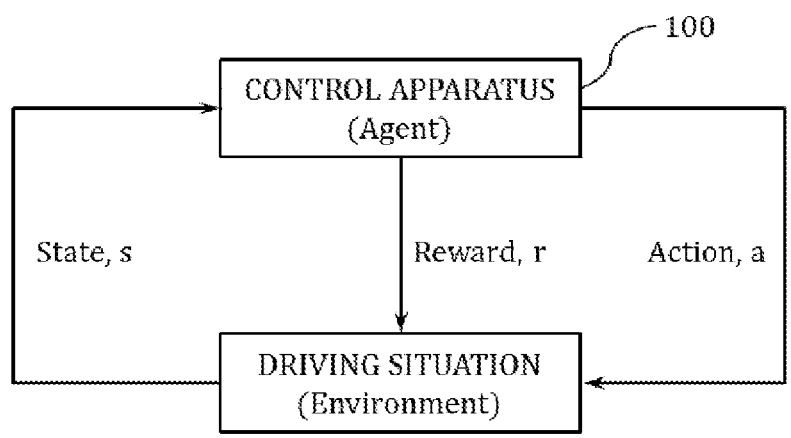
FIG. 2 is a view illustrating the structure of a learning system applied to the control apparatus in accordance with one exemplary embodiment of the present invention.

FIG. 2 is a view illustrating the structure of a learning system applied to the control apparatus in accordance with one exemplary embodiment of the present invention. Referring to FIG. 2, a learning system according to a driver's driving pattern represents an interface between an agent and an environment. Particularly, the agent refers to the control apparatus 100, and the environment refers to a driving situation.

The control apparatus 100 may be operated based on a reinforcement learning algorithm, and use Q-learning which is a type of reinforcement learning, to construct an optimum control strategy. Q-learning is excellent in terms of applicability and portability and has a high computation speed, thus being effective in learning of driver's driving patterns in various driving environments. The control apparatus 100 may be configured to recognize a current state through mutual information exchange with a driving situation, and select an action to maximize a reward r, from actions which are selectable.

The state s refers to surrounding environment information including at least one of the road information, the traffic information or the obstacle information collected by the environment information collection unit 120, and the action a refers to driver's operation information including at least one of steering wheel operation information, accelerator pedal operation information or brake pedal operation information.

Additionally, the reward r refers to a result of the action a which is acquired by transitioning the current state s to a next state s', and may be expressed as a scalar value indicating whether the driver's action a is correct. For example, the control apparatus 100 may be configured to perform learning by providing a reward when a result of driving according to the driver's operation information is correct and providing a penalty when the result of driving is incorrect, and may thus establish an optimum policy which accords with the driver's driving pattern and intention. Particularly, the action value function (Q-function) of the reward r acquired during repetition of state transition may be expressed as Equation 2 below.

$$Q^\pi(s,a) = E_\pi[r_{t+1} + \gamma r_{t+2} + \gamma^2 r_{t+3} + \ldots] = E_\pi[r(s,a) + \gamma Q^\pi(s',a')]$$ Equation 2 wherein, s' is a next state which appears when the action a is taken in the current state s, a' is all actions which may be taken in the next state s', and γ means a discount factor which determines how much a future driving condition will influence the current learning and is set to be within a numeral range from 0 to 1 (0≤γ≤1). $Q^\pi(s,a)$ is the action value function, and means an expected value of a cumulative reward acquired when a series of policies π is followed.

The control apparatus 100 may be configured to perform repetitive learning until the action value function $Q^\pi(s,a)$ converges on a maximum value based on an optimum policy π*, and the optimum policy π* may be expressed as Equation 3 below.

$$\pi^*(s) = \arg\max Q\pi(s,a)$$ Equation 3 wherein, the policy to maximize the action value function is concluded as the policy to minimize the gradient Δδ of the error δ between the first autonomous driving control value α and the at least one user control value $β_i$, and the control apparatus 100 may be configured to perform repetitive learning until the gradient Δδ of the error δ to the learning rate η converges within the minimum critical value.

FIGS. 3A-3B are views illustrating a method for generating a driving route through the control apparatus in accordance with one exemplary embodiment of the present invention. Referring to FIG. 3A, the driving strategy establishment unit 133 may be configured to divide the route acquired by the information collection unit 120 into at least one route section P, and calculate position coordinate data of a start point S and an end point F of the route section P by converting GPS information of the vehicle into Transverse Mercator (TM) coordinates which are XY absolute coordinates. In particular, the start point S of the route section P may correspond to the current position of the vehicle.

Further, the driving strategy establishment unit 133 may be configured to extract at least one boundary point $N_1$, $N_2$, $N_3$ and $N_4$ between the start point S and the end point F of the route section P based on the driving pattern of the driver output from the driving pattern learning unit 132. Particu-larly, the at least one boundary point $N_1$, $N_2$, $N_3$ and $N_4$ may include a point at which a change rate of the steering angle exceeds the critical range.

Referring to FIG. 3B, the driving strategy establishment unit 133 be configured to calculate a route equation using polynomial regression analysis, and generate a driving route DR by connecting the start point S and the end point F of the route section P and the at least one boundary point $N_1$, $N_2$, $N_3$ and $N_4$. In particular, the driving route DR may be expressed as an $m^{th}$-order polynomial route equation, i.e., Equation 4 below.

$$y = a_0 + a_1 x + a_2 x^2 + \ldots + a_m x^m$$ Equation 4 wherein, x and y mean position coordinate data, and $a_0$, $a_1$, $a_2$, ..., $a_m$ mean known values to be found, i.e., coefficients of the route equation.

The driving strategy establishment unit 133 may be configured to calculate position coordinate data of each of the at least one boundary point $N_1$, $N_2$, $N_3$ and $N_4$ based on the steering angle information, the acceleration/deceleration information, the lateral/longitudinal acceleration information, the turning radius information, etc. of the second autonomous driving control value α' output from the driving pattern learning unit 132 through repetitive learning, and calculate the coefficients $a_0$, $a_1$, $a_2$, ..., $a_m$ of the route equation.

For example, the driving strategy establishment unit 133 may be configured to calculate moving distances of the vehicle in the longitudinal and lateral directions in moving sections (e.g., $N_1$-$N_2$, $N_2$-$N_3$ and $N_3$-$N_4$) between the boundary points using an angle of deflection θ1, a turning angle θ2, a radius of rotation R and lateral/longitudinal accelerations $a_x$ and $a_y$ based on the driving pattern of the driver, and calculate the position coordinate data of each of the at least one boundary point $N_1$, $N_2$, $N_3$ and $N_4$ based on the position coordinate data of the start point S and the end point F of the route section P.

Further, the driving strategy establishment unit 133 may be configured to calculate the coefficients $a_0$, $a_1$, $a_2$, ..., $a_m$ of the $m^{th}$-order polynomial route equation by substituting the position coordinate data of the start point S, the end point F and each of the at least one boundary point $N_1$, $N_2$, $N_3$ and $N_4$ into the route equation. In particular, the number of at least one boundary point $N_1$, $N_2$, $N_3$ and $N_4$ extracted by the driving strategy establishment unit 133 may be m−1 at the least.

The driving strategy establishment unit 133 may be configured to generate the driving route DR based on the calculated $m^{th}$-order polynomial route equation, and perform autonomous driving of the vehicle based on the generated driving route DR. In particular, the storage unit 140 may be configured to store route equations of driving routes DR of respective route sections calculated by the driving strategy establishment unit 133.

Figure 4:
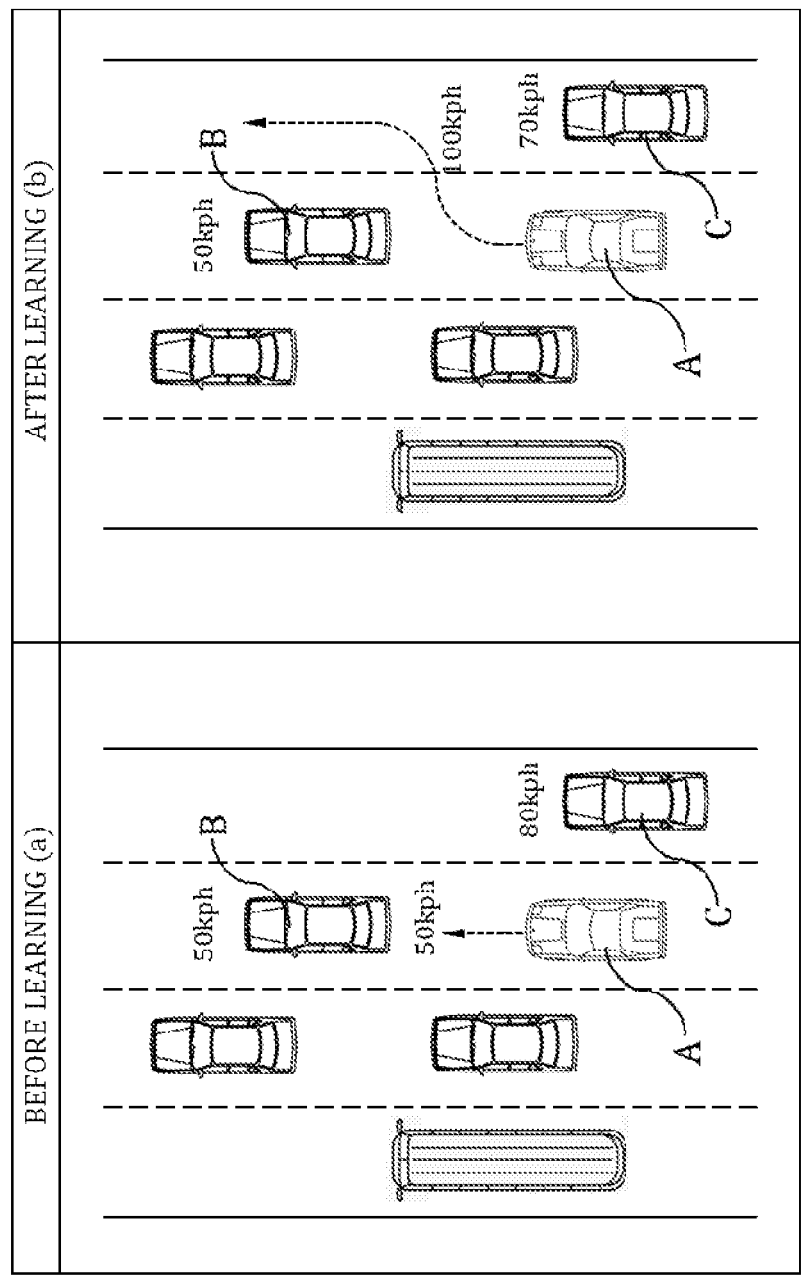
FIGS. 4 and 5 are views illustrating driving situations before and after learning of a driver's driving pattern by the control apparatus in accordance with one exemplary embodiment of the present invention.
Figure 5:
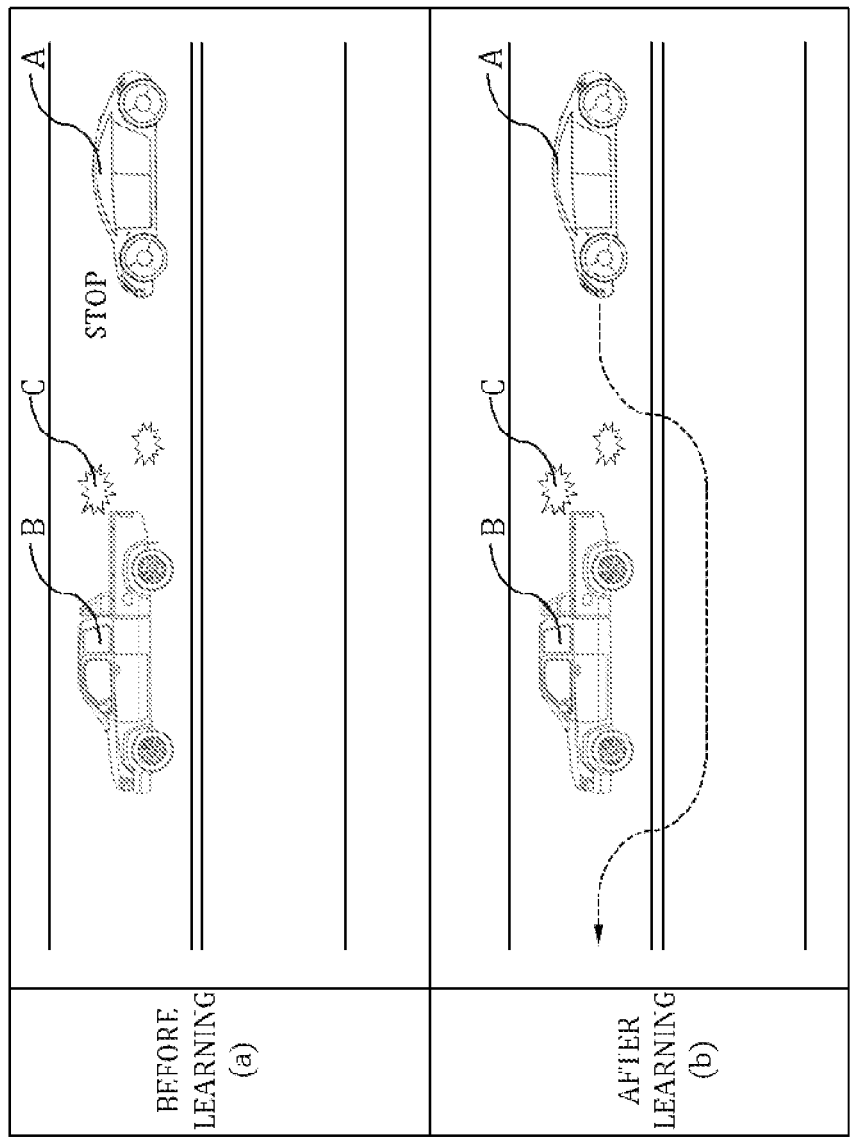

FIGS. 4 and 5 are views illustrating driving situations before and after learning of a driving pattern of the driver by the control apparatus in accordance with one exemplary embodiment of the present invention. Referring to FIG. 4, a current driving situation corresponds to the delay/congested situation L1 in which other vehicles, i.e., a vehicle B driven in a driving lane of a host vehicle A and a vehicle in a peripheral lane adjacent to the driving lane of the host vehicle A, are distributed densely (referring to Table 2).

Particularly, it may be assumed that the current speed of the host vehicle A (e.g., host vehicle or subject vehicle) is 50 kph, the current speed of the vehicle B located in front of the host vehicle A in the driving lane is 50 kph, and the current speed of the vehicle C approaching the host vehicle A from behind in the peripheral lane is 70 kph. Before learning by the control apparatus 100 of the present invention (in (a) of FIG. 4), the host vehicle A may be driven in the driving lane at a speed of 50 kph while maintaining a safe distance from the other vehicle B (e.g., second vehicle) by calculating the time to collision (TTC) with the other vehicle C (e.g., third vehicle) according to the autonomous driving rules set in advance (referring to Table 3). Such a driving pattern contributes to improvement in vehicle safety, but has limits in reflection of driving tendencies of various drivers since some drivers may desire to tune the driving pattern to suit personal tastes.

On the other hand, after learning by the control apparatus 100 of the present invention (in (b) of FIG. 4), the host vehicle A may accelerate at a speed of 100 kph within a range causing no collision with the other vehicle C approaching the host vehicle A in the peripheral lane according to a driving pattern in which a driver's dynamic tendency is reflected, and perform lane change to a right lane. Accordingly, the control apparatus 100 in accordance with one exemplary embodiment may flexibly cope with various situations according to the driver's driving tendency, escaping from a uniform driving pattern, thus enabling driver-customized driving. Thereby, sense of difference between real driving by the driver and autonomous driving may be reduced, and ride comfort of the autonomous vehicle may be improved.

Referring to FIG. 5, a current driving situation corresponds to the unexpected situation L3 in which an object falls onto a driving lane from another vehicle B located in front of a host vehicle A (referring to Table 2). Particularly, a road is a two-lane road which has one lane each way, and it is assumed that no vehicle is present in another lane in the opposite direction to the driving lane.

Before learning by the control apparatus 100 of the present invention (in (a) of FIG. 5), the host vehicle A may be stopped until the fallen object C is removed under the condition that the host vehicle A does not violate the centerline according to the autonomous driving rules set in advance (referring to Table 3). However, such a passive driving pattern interrupts traffic flow on the two-lane road and causes sense of difference between real driving by a driver and autonomous driving.

On the other hand, after learning by the control apparatus 100 of the present invention (in (b) of FIG. 5), the host vehicle A may confirm whether a vehicle is present in the opposite lane, and overtake the other vehicle B by violating the centerline to avoid the fallen object C. Accordingly, the control apparatus 100 in accordance with one exemplary embodiment may flexibly cope with a sudden unexpected situation, thus reducing sense of difference between real driving by a driver and autonomous driving without interrupting the traffic flow.

Figure 6:
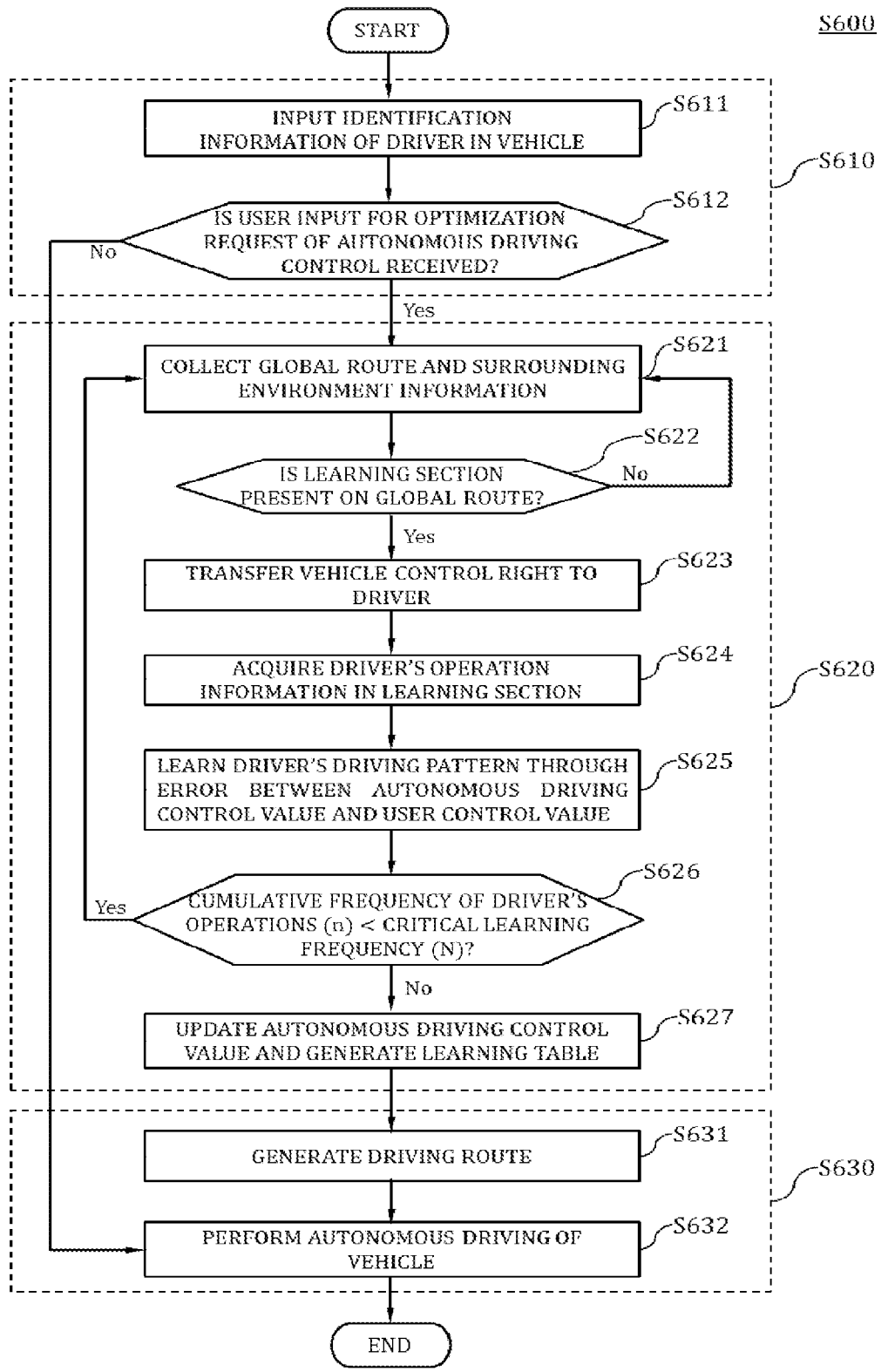
FIG. 6 is a flowchart illustrating a method for controlling an autonomous vehicle in accordance with one exemplary embodiment of the present invention.

FIG. 6 is a flowchart illustrating a method for controlling an autonomous vehicle in accordance with one exemplary embodiment of the present invention. Referring to FIG. 6, a method 600 for controlling an autonomous vehicle may include receiving designated information from a user (Operation S610), learning a driver's driving pattern (Operation S620), and executing autonomous driving (Operation S630).

First, the user input unit 110 may be configured to receive identification information of a driver in the vehicle during vehicle operation to generate driving patterns of various users (Operation S611). Thereafter, the user input unit 10 may be configured to determine whether user input for an optimization request of autonomous driving control based on a driving pattern of the driver is received (Operation S612). When the user input for the optimization request of autonomous driving control based on the driving pattern of the driver is not received from the user input unit 10 (No in Operation S612), the controller 130 may be configured to execute autonomous driving of the vehicle using a recently learned driving pattern of the driver and/or a driving pattern of the autonomous vehicle set in advance before coming onto the market (Operation S632).

On the other hand, when the user input for the optimization request of autonomous driving control based on the driving pattern of the driver is received from the user input unit 10 (Yes in Operation S612), the information collection unit 120 may be configured to acquire a route and surrounding environment information from the peripheral devices 10 and/or the sensor devices 20 mounted within the vehicle (Operation S621). Particularly, the surrounding environment information may include at least one of road information, traffic information or obstacle information.

Thereafter, the controller 130 may be configured to determine whether a learning section is present on the route based on the various surrounding environment information collected by the information collection unit 120 (Operation S622). For example, the learning section may include a delayed/congested situation, an acceleration/deceleration situation, an unexpected situation, a straight section, a curved section, a downhill section, and an electronic toll collection section.

When the current driving situation of the vehicle does not correspond to the learning section (No in Operation S622), the control method S600 may return to Operation S621. On the other hand, when the current driving situation of the vehicle corresponds to the learning section (Yes in Operation S622), the controller 130 may be configured to switch from the autonomous driving mode to the manual driving mode and transfer a vehicle control right to the driver (Operation S623). Thereafter, the controller 130 may be configured to acquire driver's operation information in which the driver gaining the vehicle control right applies to the driving device 30 of the vehicle (Operation S624). In particular, the driver's operation information may include operation information of at least one of the steering wheel, the accelerator pedal or the brake pedal.

Thereafter, the controller 130 may be configured to acquire an error $\delta$ between a first autonomous driving control value $\alpha$ which is set in advance in the vehicle based on set rules, and at least one user control value $\beta_i$ which is calculated based on the driver's operation information through comparison therebetween, and learn a driving pattern of the driver by updating the first autonomous driving control value $\alpha$ so that a gradient $\Delta\delta$ of the error $\delta$ to a learning rate $\eta$ ($\Delta\delta=d\delta/d\eta$) converges on a minimum critical value (Operation S625). In particular, a reinforcement learning algorithm which is a type of machine learning may be used as one example of a learning method.

Further, the controller 130 may be configured to perform a validity test of the at least one user control value $\beta_i$ by applying a compensation weight w to the error $\delta$ (Operation S625). Particularly, the compensation weight w may be set to a different value according to at least one of a collision risk w1 or a ride comfort index w2 based on the driver's operation information. Thereafter, the controller 130 may be configured to determine whether a cumulative frequency n of driver's operations reaches a critical learning frequency N (Operation S626). In particular, the cumulative frequency n of driver's operations refers to a cumulative value of the frequencies of driver's operations applied to the driving device 30 in the corresponding learning section, and the critical learning frequency N refers to a frequency of convergences of the error gradient Δδ within a minimum critical value.

The controller 130 may be configured to repeatedly perform Operations S621 to S625 until the cumulative frequency n of driver's operations reaches the critical learning frequency N (Yes in Operation S626). As a result of determination of Operation S626, when the cumulative frequency n of driver's operations reaches the critical learning frequency N (No in Operation S626), the controller 130 may be configured to output an autonomous driving control value α' updated based on the learned driving pattern of the driver, and the storage unit 140 may be configured to generate at least one learning table corresponding to driver identification information (Operation S627). Particularly, each of the at least one learning table 142 may be generated to correspond to each of at least one driver identification information (user1, user2, user3, etc.) by constructing indexes for the learning section L and the driving pattern of the driver or the updated autonomous driving control value α'.

Thereafter, the controller 130 may be configured to extract at least one boundary point on the route based on the learned driving pattern of the driver, and generate a driving route by connecting the current position of the vehicle and the at least one boundary point through polynomial regression analysis (Operation S631). Such Operation was described above in reference to FIGS. 3A and 3B and a detailed description thereof will be omitted. Thereafter, the controller 130 may be configured to execute autonomous driving of the vehicle based on the generated driving route and the learned driving pattern of the driver (Operation S632).

The above-described control method in accordance with one exemplary embodiment may be recorded as a program which may be executed in computers and be stored in a non-transitory computer readable recording medium and, for example, non-transitory computer readable recording media may include a ROM, a RAM, a CD-ROM, a magnetic tape, a floppy disk, an optical data storage device, etc.

The non-transitory computer readable recording media may be distributed to computer systems connected by a network and, herein, computer readable code may be stored and executed in a distributed manner. Further, functional programs, code and code segments to implement the above-described method may be easily deduced by programmers in the art to which the embodiments pertain.

As apparent from the above description, an apparatus and method for controlling an autonomous vehicle may flexibly cope with a driving situation according to a driver's driving tendency, escaping from a uniform driving pattern, thus executing user-friendly autonomous driving control. Therefore, sense of difference between real driving by a driver and autonomous driving may be reduced. Further, learning tables of various users may be constructed, and thus, a driver-customized autonomous driving strategy may be used, and individual ride comfort requirements of the users may be satisfied.

While the invention has been explained in relation to the embodiments thereof, it will be understood that various modifications thereof will become apparent to those skilled in the art upon reading the specification. Technical contents of the above-described embodiments may be combined into various types unless they are mutually incompatible, and thereby, new embodiments may be implemented.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An apparatus for controlling an autonomous vehicle, comprising:
a user input unit including at least one processor and configured to receive identification information of a driver in the vehicle during autonomous driving;
an information collection unit including at least one processor and configured to acquire a global route of the vehicle and surrounding environment information; and
a controller configured to determine a learning section on the global route based on the surrounding environment information and output a driving pattern of the driver by performing repetitive learning based on operation information of the driver in the learning section,
wherein the controller is configured to execute autonomous driving of the vehicle based on the output driving pattern of the driver;
wherein the controller is configured to learn the driving pattern of the driver by acquiring an error between an autonomous driving control value which is set in advance in the vehicle and at least one user control value which is calculated based on the operation information of the driver through comparison therebetween and updating the autonomous driving control value so that a gradient of the error to a learning rate coverages within a minimum critical value,
wherein the controller configured to perform a validity test of the at least one user control value by applying a compensation weight w to the error,
wherein the compensation weight w is set to a different value according to at least one of a collision risk w1 and a ride comfort index w2 based on the operation information of the driver, and
wherein the compensation weight w is set so that the collision risk w1 is inversely proportional to a time collision (TTC) and the ride comfort index w2 is inversely proportional to the size of a jerk.

2. The apparatus according to claim 1, wherein the surrounding environment information includes at least one selected from the group consisting of: road information, traffic information, and obstacle information, collected by sensors mounted within the vehicle.

3. The apparatus according to claim 1, wherein the learning section includes at least one selected from the group consisting of: a delayed/congested situation, an acceleration/deceleration situation, an unexpected situation, a straight section, a curved section, a downhill section, and an electronic toll collection section.

4. The apparatus according to claim 1, wherein the controller is configured to switch from an autonomous driving mode to a manual driving mode and transfer a vehicle control right to the driver, when a current driving situation of the vehicle recognized based on the surrounding environment information corresponds to the learning section.

5. The apparatus according to claim 1, wherein the operation information of the driver includes operation information of at least one selected from the group consisting of: a steering wheel, an accelerator pedal, and a brake pedal, mounted within the vehicle.

6. The apparatus according to claim 1, wherein each of the autonomous driving control value and the user control value includes at least one selected from the group consisting of: a steering angle, an acceleration, a deceleration, a relative speed, a turning radius, a lateral acceleration, and a longitudinal acceleration of the vehicle.

7. The apparatus according to claim 1, further comprising a storage unit configured to generate a learning table according to the identification information of the driver by generating indexes for the learning section and the driving pattern of the driver.

8. The apparatus according to claim 1, wherein the controller is configured to:
   extract at least one boundary point on the global route based on the driving pattern of the driver;
   generate a driving route by connecting a current position of the vehicle and the at least one boundary point through polynomial regression analysis; and
   execute the autonomous driving of the vehicle based on the generated driving route.

9. The apparatus according to claim 8, wherein the at least one boundary point includes a point at which a change rate of a steering angle exceeds a critical range.

10. A method for controlling an autonomous vehicle, comprising:
    receiving, by a controller, identification information of a driver within the vehicle during autonomous driving;
    acquiring, by the controller, a global route of the vehicle and surrounding environment information from sensors mounted within the vehicle;
    determining, by the controller, a learning section on the global route based on the surrounding environment information;
    outputting, by the controller, a driving pattern of the driver by performing repetitive learning based on operation information of the driver in the learning section; and
    executing, by the controller, autonomous driving of the vehicle based on the output driving pattern of the driver;
    wherein the outputting of the driving pattern of the driver comprises:
    learning by the controller, the driving pattern of the driver by acquiring an error between an autonomous driving control value which is set in advance in the vehicle and at least one user control value which is calculated based on the operation information of the driver through comparison therebetween and updating the autonomous driving control value so that a gradient of the error to a learning rate coverages within a minimum critical value,
    updating, by the controller, the autonomous driving control value so that a gradient of the error to a learning rate coverages within a minimum critical value,
    wherein the learning of the driving pattern of the driver includes performing, by the controller, a validity test of the at least one user control value by applying a compensation weight to the error,
    wherein the compensation weight w is set to a different value according to at least one of a collision risk w1 and a ride comfort index w2 based on the operation information of the driver,
    wherein the compensation weight w is set so that the collision risk w1 is inversely proportional to a time collision (TTC) and the ride comfort index w2 is inversely proportional to the size of a jerk.

11. The method according to claim 10, wherein the determining of the learning section includes: switching, by the controller, from an autonomous driving mode to a manual driving mode and transferring a vehicle control right to the driver, when a current driving situation of the vehicle recognized based on the surrounding environment information corresponds to the learning section.

12. The method according to claim 10, further comprising: generating, by the controller, a learning table according to the identification information of the driver by generating indexes for the learning section and the driver's driving pattern.

13. The method according to claim 10, further comprising:
    extracting, by the controller, at least one boundary point on the global route based on the driving pattern of the driver; and
    generating, by the controller, a driving route by connecting a current position of the vehicle and the at least one boundary point through polynomial regression analysis,
    wherein, in the executing of the autonomous driving of the vehicle, the autonomous driving of the vehicle is performed based on the generated driving route.

14. The method according to claim 13, wherein the at least one boundary point includes a point at which a change rate of a steering angle exceeds a critical range.

15. A non-transitory computer readable recording medium having recorded thereon an application program, which when executed by a processor, causes the processor to perform the method according to claim 10.

* * * * *